United States Patent [19]
Ydoate et al.

[11] Patent Number: 5,738,202
[45] Date of Patent: Apr. 14, 1998

[54] METHODS AND APPARATUS FOR ESTABLISHING A DESIRED POSITIONAL RELATIONSHIP BETWEEN RANDOM-LENGTH ARTICLES CONVEYED IN SINGLE FILE

[75] Inventors: Edward Ydoate; Goro Okada, both of Louisville, Ky.

[73] Assignee: Sandvik Sorting Systems, Inc., Louisville, Ky.

[21] Appl. No.: 576,475

[22] Filed: Dec. 21, 1995

[51] Int. Cl.⁶ .................................................. B65G 47/26
[52] U.S. Cl. ................................. 198/460.1; 198/459.8; 198/461.1
[58] Field of Search ............................ 198/459.8, 460.1, 198/461.1, 459.1

[56] References Cited

U.S. PATENT DOCUMENTS

| | | |
|---|---|---|
| 3,335,841 | 8/1967 | Klingel et al. |
| 3,458,026 | 7/1969 | Lauzon et al. .................. 198/460.1 |
| 3,485,339 | 12/1969 | Miller et al. |
| 3,774,748 | 11/1973 | Dederer et al. |
| 4,197,935 | 4/1980 | Aterianus et al. |
| 4,604,704 | 8/1986 | Eaves et al. |
| 4,915,209 | 4/1990 | Canziani. |
| 5,022,644 | 6/1991 | Bürge. |
| 5,038,911 | 8/1991 | Doane et al. |
| 5,070,995 | 12/1991 | Schaffer et al. |
| 5,082,103 | 1/1992 | Ross et al. |
| 5,141,097 | 8/1992 | Oiry et al. |
| 5,165,520 | 11/1992 | Herve et al. |
| 5,222,586 | 6/1993 | Ydoate et al. |
| 5,253,765 | 10/1993 | Moorehead et al. |
| 5,267,638 | 12/1993 | Doane. |
| 5,341,916 | 8/1994 | Doane et al. .................. 198/460.1 |

*Primary Examiner*—James R. Bidwell
*Attorney, Agent, or Firm*—Burns, Doane, Swecker & Mathis, L.L.P.

[57] ABSTRACT

Articles of random length are conveyed in single file while being transferred from a first driven conveyor to a second driven conveyor. The second conveyor is driven faster than the first conveyor so that an initial gap is established between the articles. Front and rear ends of the articles are sensed while traveling along the second conveyor toward a third conveyor. From that sensed information, there is determined an actual front-to-front distance between the front end of each article to the front end of the next article. The speed of the second conveyor is varied, as necessary, to create a desired minimum front-to-front distance between successive articles. Optionally, that minimum front-to-front distance is established while ensuring that a minimum gap is maintained between successive articles.

19 Claims, 3 Drawing Sheets

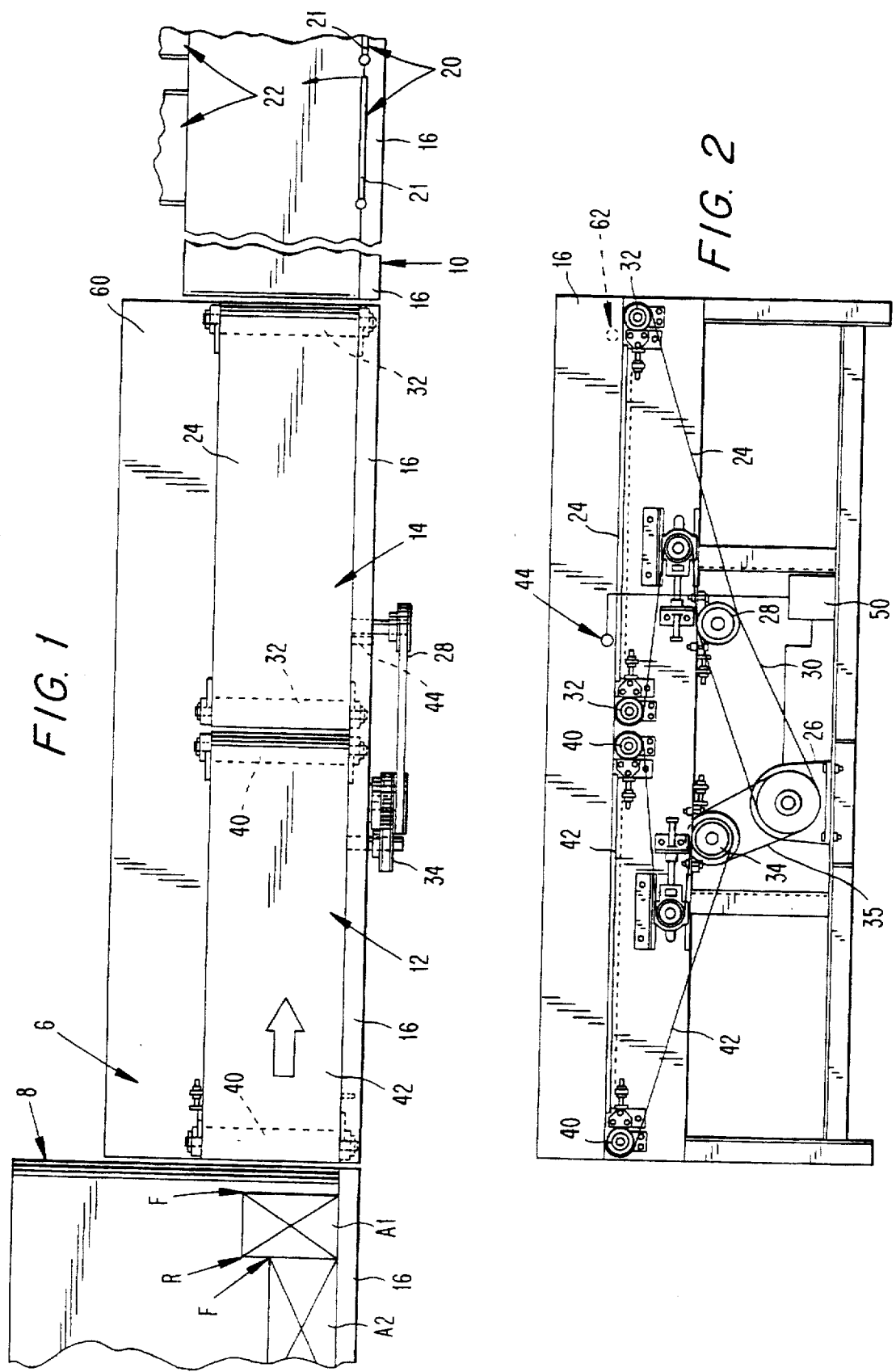

METHODS AND APPARATUS FOR ESTABLISHING A DESIRED POSITIONAL RELATIONSHIP BETWEEN RANDOM-LENGTH ARTICLES CONVEYED IN SINGLE FILE

BACKGROUND OF THE INVENTION

The present invention relates to the conveying of a row of random-length articles while establishing a desired positional relationship between successive ones of the articles.

Sorting systems are in use which handle a large number of random-length articles by arranging the articles in single file and then conveying the articles to a sorter mechanism which redirects the articles to various branch lines for storage or rerouting. The redirecting of the articles is achieved by a series of mechanical diverters which physically displace respective articles from a conveyor. The articles are typically encoded with information relating to category (in a storage system) or destination (in a rerouting system), and the location of the articles along the conveyor system is monitored so that the respective diverters can be signaled to discharge particular articles onto the proper branch lines.

It is desirable to maximize the number of articles that are sorted per unit time, i.e., the overall throughput of the system. While that goal would seem to call for the establishment of a high speed row of closely adjacent (e.g., mutually abutted) articles, the result may be that the diverters do not have sufficient time to complete a discharge operation, i.e., to move to an article-discharge position and then to a rest position, without accidentally striking the next article in the row.

One way of dealing with that problem has been to create gaps between successive articles supplied to the sorting mechanism. By "gap" is meant a spacing between a rear end of an article and a front end of the next article. A typical way of creating such gaps has been to transfer the articles from an upstream conveyor to a faster-moving downstream conveyor. The lengths of the gaps established in that way will vary as a function not only of the relative conveyor speeds, but also of the lengths of the articles. That is, the length of the gap between leading and trailing articles will be directly proportional to the length of the leading article. Thus, if the relative speed between the conveyors is set to achieve a desired gap size between a short article and the next article, (i.e., if the mechanism is "tuned" for short articles), then the gap established between a long article and the next article may be excessive, thereby reducing the overall throughput of the system.

To deal with that shortcoming, a gaping method has previously been proposed in which the articles are initially gaped as they are fed from an initial gaping conveyor to an induct control conveyor, and the rate of speed of the induct control conveyor is selectively varied (i.e., accelerated or decelerated) after the leading article has been transferred to a receiver conveyor, to establish a predetermined gap length between the rear end of the leading article and the front end of the next (trailing) article, i.e., a rear-to-front gap (e.g., see U.S. Pat. No. 5,267,638). While that technique may somewhat alleviate the above-described shortcoming by establishing uniformly sized gaps between the articles, room for improvement remains.

SUMMARY OF THE INVENTION

The present invention stems from the realization that a long article may, simply by virtue of its length, provide sufficient time for the diverter to complete a discharge stroke without accidentally discharging the next article.

One aspect of the present invention relates to a method of longitudinally conveying random-length articles in single file while establishing a minimum front-to-front distance between successive leading and trailing articles. The method comprises the steps of:

A) transferring the leading and trailing articles sequentially from a driven upstream conveyor to a driven variable speed downstream conveyor, while driving the downstream conveyor faster than the upstream conveyor, to create an initial gap between the leading and trailing articles;

B) transferring, subsequent to step A, the leading article onto a receiver conveyor;

C) sensing, subsequent to step A and prior to step B, front and rear ends of the leading article and determining an actual length thereof and an actual front-to-front distance between the leading and trailing articles;

D) comparing, subsequent to step C and prior to step B, the actual length of the leading article with a minimum front-to-front distance value;

E) comparing, subsequent to step C and prior to step B, the minimum front-to-front distance value with the actual front-to-front distance;

F) controlling, subsequent to step B, the speed of the downstream conveyor on which the trailing article is disposed, to make the actual front-to-front distance equal to the minimum front-to-front distance value, when the minimum front-to-front distance value exceeds the actual length of the leading article; and G) controlling, subsequent to step B, the speed of the downstream conveyor on which the trailing article is disposed, to make the actual front-to-front distance equal to the actual length of the leading article, when such actual length exceeds the minimum front-to-front distance value.

Another aspect of the invention relates to an apparatus for longitudinally conveying random-length articles in single file while establishing a minimum front-to-front distance between successive leading and trailing articles. The apparatus comprises:

a driven upstream conveyor for conveying the leading and trailing articles at a first speed;

a variable speed-driven downstream conveyor for receiving the leading and trailing articles from the upstream conveyor and conveying the leading and trailing articles at a second speed faster than the first speed, to create an initial rear-to-front gap between the leading and trailing articles;

a receiver conveyor for receiving the leading and trailing articles from the downstream conveyor;

a sensor for sensing front and rear ends of the leading article traveling on the downstream conveyor; and a controller connected to the sensor and to a drive motor of the downstream conveyor for:
determining an actual length of the leading article and an actual front-to-front distance between the leading and trailing articles;
comparing the actual length of the leading article with a minimum front-to-front distance value;
comparing the minimum front-to-front distance value with the actual front-to-front distance;
controlling the speed of the downstream conveyor on which the trailing article is disposed, to make the actual front-to-front distance equal to the minimum front-to-front distance value, when the minimum front-to-front distance value exceeds the actual length of the leading article; and controlling the speed of the downstream conveyor on which the trailing article is disposed, to make the actual front-to-front distance equal to the actual length of the leading article, when such actual length exceeds the minimum front-to-front distance value.

Yet another aspect of the invention involves a method of longitudinally conveying random-length articles in single file while establishing a minimum front-to-front distance and a minimum rear-to-front gap between successive leading and trailing articles. The method comprises the steps of:

A) transferring the leading and trailing articles sequentially from a driven upstream conveyor to a driven variable speed downstream conveyor, while driving the downstream conveyor faster than the upstream conveyor, to create an initial rear-to-front gap between the leading and trailing articles;

B) transferring, subsequent to step A, the leading article onto a receiver conveyor;

C) sensing, subsequent to step A and prior to step B, front and rear ends of the leading article and determining an actual length thereof and an actual front-to-front distance between the leading and trailing articles;

D) comparing, subsequent to step C and prior to step B, the actual length of the leading article with a minimum front-to-front distance value and a minimum rear-to-front gap value;

E) comparing, subsequent to step C and prior to step B, the minimum front-to-front distance value with the actual front-to-front distance;

F) controlling, subsequent to step B, the speed of the downstream conveyor on which the trailing article is disposed, to make the actual front-to-front distance equal to a sum of the actual length of the leading article plus the minimum rear-to-front gap value, when the actual length exceeds the minimum front-to-front distance value;

G) controlling, subsequent to step B, the speed of the downstream conveyor on which the trailing article is disposed, to make the actual front-to-front distance equal to the sum of the actual length of the leading article plus the minimum rear-to-front gap value, when the minimum front-to-front distance value exceeds the actual length by an amount less than the minimum gap value; and H) controlling, subsequent to step B, the speed of the downstream conveyor on which the trailing article is disposed, to make the actual front-to-front distance equal to the minimum front-to-front distance value when the minimum front-to-front distance value exceeds the actual length by an amount greater than the minimum rear-to-front gap value.

An additional aspect of the invention concerns an apparatus for longitudinally conveying random-length articles in single file while establishing a minimum front-to-front distance and a minimum rear-to-front gap between successive leading and trailing articles. The apparatus comprises a driven upstream conveyor for conveying the leading and trailing articles at a first speed;

variable speed-driven downstream conveyor for receiving the leading and trailing articles from the upstream conveyor and conveying the leading and trailing articles at a second speed faster than the first speed, to create an initial rear-to-front gap between the leading and trailing articles;

a receiver conveyor for receiving the leading and trailing articles from the downstream conveyor;

a sensor for sensing front and rear ends of the leading article traveling on the downstream conveyor; and a controller connected to the sensor and to a drive motor of the downstream conveyor for determining an actual length of the leading article and an actual front-to-front distance between the leading and trailing articles;

comparing the actual length of the leading article with a minimum front-to-front distance value and a minimum rear-to-front gap value;

comparing the minimum front-to-front distance value with the actual front-to-front distance;

controlling the speed of the downstream conveyor on which the trailing article is disposed, to make the actual front-to-front distance equal to a sum of the actual length of the leading article plus the minimum rear-to-front gap value, when the actual length exceeds the minimum front-to-front distance value;

controlling the speed of the downstream conveyor on which the trailing article is disposed, to make the actual front-to-front distance equal to the sum of the actual length of the leading article plus the minimum rear-to-front gap value, when the minimum front-to-front distance value exceeds the actual length by an amount less than the minimum rear-to-front gap value; and controlling the speed of the downstream conveyor on which the trailing article is disposed to make the actual front-to-front distance equal to the minimum front-to-front distance value when the minimum front-to-front distance value exceeds the actual length by an amount greater than the minimum rear-to-front gap value.

BRIEF DESCRIPTION OF THE DRAWING

The objects and advantages of the invention will become apparent from the following detailed description of preferred embodiments thereof in connection with the accompanying drawings in which like numerals designate like elements and in which:

FIG. 1 is a top plan view of a conveyor apparatus according to the present invention;

FIG. 2 is a side elevational view of a portion of the conveyor system according to FIG. 1;

DETAILED DESCRIPTION OF PREFERRED EMBODIMENTS OF THE INVENTION

Figure 3:
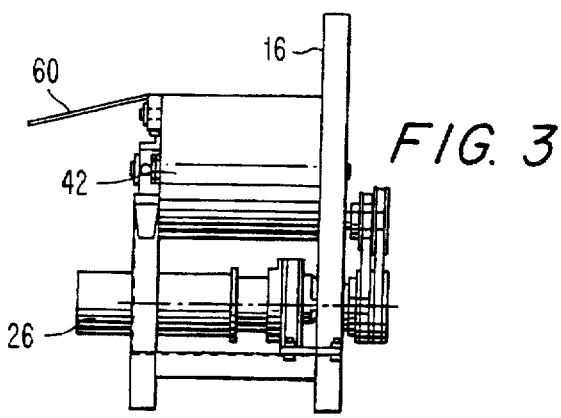
FIG. 3 is an end view of FIG. 2.

A conveyor apparatus 6 for controlling the flow of a row of random-length articles A1, A2, etc. between a delivery conveyor 8 and a receiver conveyor 10, comprises a pair of conveyors, namely an upstream conveyor 12 and a downstream conveyor 14. The conveyors 8, 10, 12, 4 include vertical walls 16 against which the articles can abut.

The conveyors 8, 10, 12, 14 operate as a jam prevention conveyor under principles described in U.S. Pat. No. 5,222, 586, wherein the transverse width of conveyor 8 is greater than that of each of conveyors 10, 12, 14, and wherein the transverse width of each of conveyors 12, 14 is less than one-half of the transverse width of conveyor 10. In the event that packages are traveling side-by-side, the outermost package will slide down a chute 60 disposed adjacent the conveyors 12, 14.

The delivery conveyor 8 may be disposed downstream of a conventional singulator conveyor (not shown) in which a stream of randomly arranged articles of random size are oriented into a single file. The receiver conveyor 10 conveys articles toward a series of diverter mechanisms 20 in the form of swingable arms 21 that are selectively actuable to discharge articles onto respective branch lines 22.

Figure 7:
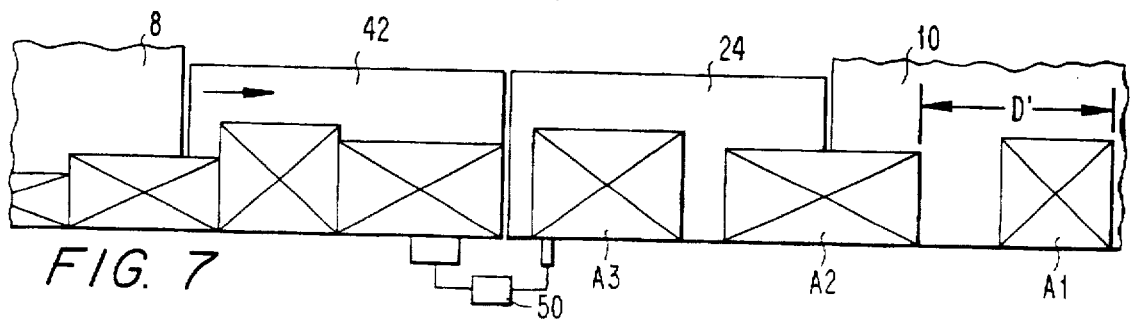
Figure 8:
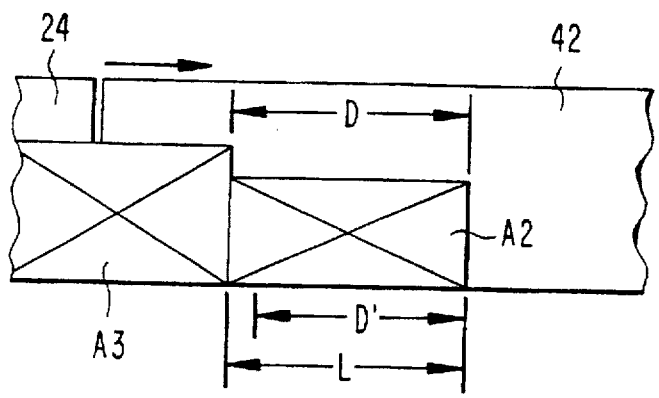
FIG. 8–10 are top plan schematic views representing different relative positions of articles dealt with in accordance with the present invention.

In order to enable the swinging arms to discharge an article without inadvertently striking the next (trailing) article, the present invention functions to create a minimum front-to-front distance D' (see FIG. 7) between each article and the next (trailing) article, (i.e., a distance from the front end F of one article to the front end F of the next article).

Figure 6:
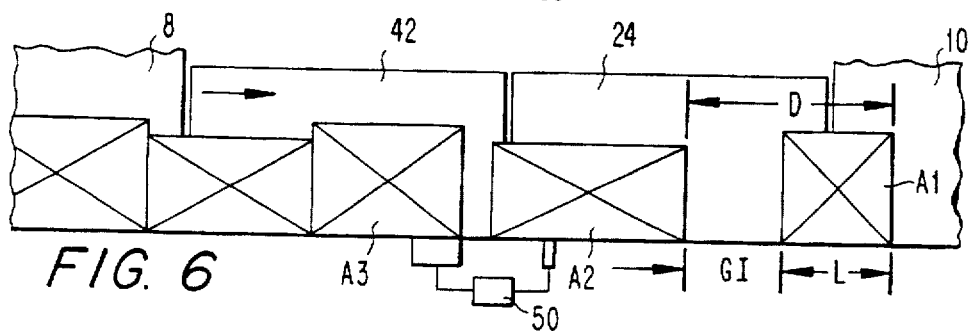

The upstream and downstream conveyors 12, 14 cooperate to establish an initial gap (see the initial gap GI shown in FIG. 6) between a rear end R of the leading article and a front end F of the trailing article, and then the downstream conveyor 14, which can be termed a metering conveyor, establishes the minimum front-to-front distance D' between successive articles. The term "gap" as used herein shall refer to a space between a rear end of an article and a front end of the next article.

The downstream conveyor 14 preferably comprises a high-friction endless belt 24 driven by a variable speed electric motor 26, by means of a sprocket wheel 28 that is driven by a toothed timing belt 30. The upstream conveyor 12 is driven by a sprocket 34 which, in turn, is driven by a timing belt 35 connected to the motor 26. The belt 24 travels around idler rollers 32, and the belt travels around idler rollers 40.

The sprocket ratios are set so that the upstream belt 42 travels at a slower speed than the downstream belt 24, with the ratio between those speeds being constant. Thus, the upstream and downstream belts 42, 24 are driven at variable speeds, with the upstream belt 42 always being driven at a fixed speed ratio relative to the faster-moving downstream belt 24.

It will be appreciated that since the downstream belt 24 is traveling faster than the upstream belt 42, an article which is transferred from the upstream belt to the downstream belt will assume an increased speed once it has been transferred to the downstream belt. An article is considered to have been transferred to a belt when a midpoint of the article passes onto the belt. That increase in speed of the article causes a rear-to-front gap to be created between a rear end of that (leading) article and a front end of the next (trailing) article. The size of that gap will be a function of the length of the leading article, i.e., the longer the length, the greater the gap.

That initial gap is established for the purpose of facilitating the operation of the downstream conveyor. That is, a sensor 44, such as a photoeye, is arranged adjacent the downstream belt 24, in order to detect the front and rear ends F,R of each article. If the articles are contiguous, i.e., mutually touching, then the sensor would "see" only one long article. By providing a gap between successive articles, the sensor is able to distinguish between the front and rear ends of each article.

As a result, a controller 50 connected to the sensor 44, is able to determine the length of each article and the actual front-to-front distance D between successive articles, since a signal representative of the speed of the downstream conveyor 14 also is supplied to the controller 50. Thus, the controller is able to compare the actual front-to-front distance with a minimum or reference front-to-front distance, the latter being chosen to provide the diverter mechanisms 20 with sufficient time to discharge an article without striking the next article.

If the actual front-to-front distance between leading and trailing articles exceeds the minimum front-to-front distance, then once the leading article has been transferred to the receiver conveyor 10, the speed of the downstream belt 24 can be increased to a speed sufficient to make the final front-to-front distance equal to the minimum front-to-front distance.

As observed earlier, the major function of the flow control mechanism 6 is to establish a minimum front-to-front distance between successive articles to provide the diverter mechanisms with sufficient time to perform an article discharge operation and assume a ready position for the next discharge operation, without striking a trailing article. Some types of diverter mechanisms, such as the swinging arm types depicted in FIG. 1, may also present a risk of striking an article disposed in front of the article being discharged. In that case, it would be desirable to establish a minimum gap between successive articles in order to ensure that an outer end of the arm, during its discharge stroke, does not strike an article traveling ahead of an article being discharged.

Figure 9:
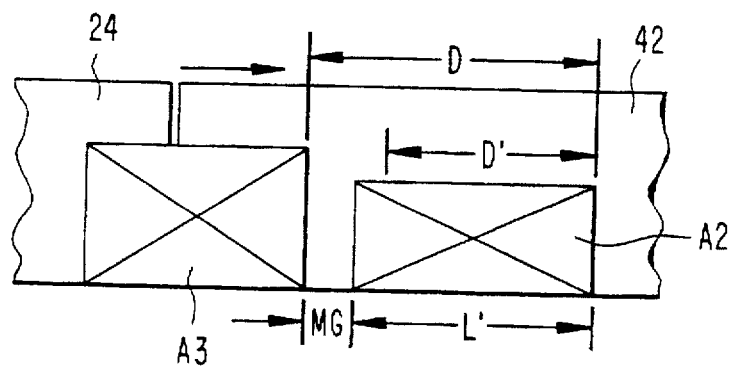
Figure 10:
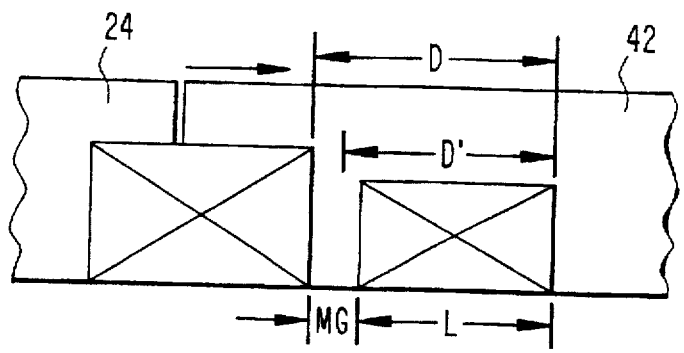

Therefore, in the following description, steps appropriate for each case will be explained, i.e., the case where only a minimum front-to-front distance is to be established between successive articles (FIGS. 4–8), and the case where a minimum front-to-front distance and a minimum gap are to be established between successive articles (FIGS. 9–10).

Figure 4:
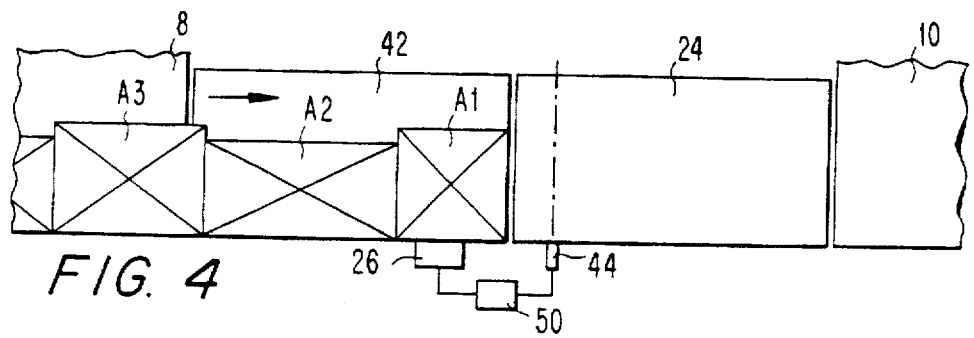
FIGS. 4–7 are top plan schematic views depicting one manner of operation of the invention.
Figure 5:
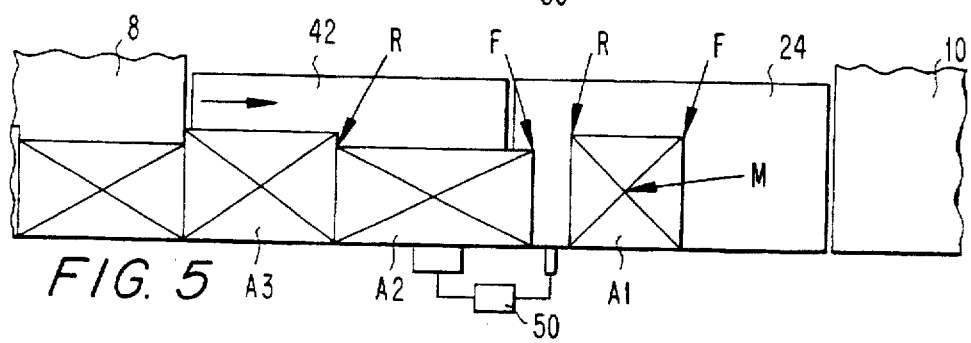

As depicted in FIG. 4, first, second and third articles A1, A2 and A3 are being conveyed in single file. The first and second articles A1 and A2 are in leading and trailing relationship, respectively; and the second and third articles A2 and A3 are in leading and trailing relationship, respectively. In FIG. 4, the first article A1 is disposed on the belt 42 and is approaching the belt 24. Once the midpoint M of the first article A1 passes onto the belt 24, the first article A1 will increase in speed, since the belt 24 always travels faster than the belt 42. The first article A1 will thus travel faster than the second article A2 until the midpoint of the second article passes onto the belt 24. Hence, an initial gap GI will be established between the first and second articles A1 and A2 (see FIG. 6). As the articles pass the photoeye 44, their front and rear ends F, R will be sensed. Signals representative of that information as well as the speed of the belt 24, are supplied to the controller 50 which is able to determine the actual length (and thus the midpoint M) of the first article A1, the size of the initial gap GI, and the actual front-to-front distance D (FIG. 6) between the first and second articles A1, A2. The controller is also able to determine when the midpoint of the first article A1 will pass onto the receiver conveyor 10.

No Minimum Gap Required/Article Actual Length Less Than or Equal to Minimum Front-to-Front Distance The controller 50 then compares the actual front-to-front distance D with a value representing the minimum front-to-front distance D', and also compares the actual length L of the first article A1 with the minimum front-to-front distance value. If the actual length L is less than the minimum front-to-front distance value, then once the midpoint M of the first article is determined to have passed onto the receiver conveyor 10, the controller controls the speed of the downstream conveyor 24 to make the actual front-to-front distance D equal to the minimum front-to-front distance D'. That is, if the actual front-to-front distance is greater than the minimum front-to-front distance value, then the belt 24 will have its speed increased to a level sufficient to reduce the actual front-to-front distance so that it becomes equal to the minimum front-to-front distance by the time that the midpoint of the second article passes onto the receiver conveyor 10. If the actual front-to-front distance is less than the minimum front-to-front distance, then the belt 24 will be slowed to a level sufficient to increase the actual front-to-front distance so that it becomes equal to the minimum front-to-front distance value by the time that the midpoint of the second article A2 passes onto the receiver conveyor 10.

No Minimum Gap Required/Article Actual Length Exceeds Minimum Front-to-Front Distance If the actual length of a leading article, e.g., the second article A2, is greater than the minimum front-to-front distance value (see FIG. 8), then it will be appreciated that the actual front-to-front distance D cannot be made to equal the minimum front-to-front distance D'. For example, if the actual length L of the second article A2 is greater than the minimum front-to-front distance value, the speed of belt 24 is increased to make the actual front-to-front distance D equal to the actual length L, i.e., the third article A3 will abut the second article A2, as shown in FIG. B.

The fact that the actual front-to-front distance is now greater than the minimum front-to-front distance merely means that a diverter mechanism will have even more time to complete its article-discharge operation without making contact with a trailing article.

Minimum Gap Required/Article Actual Length Less than Minimum Front-to-Front Distance by an Amount Equal to or Greater than the Minimum Gap It will be appreciated that if a gap is required between successive articles, and the article actual length is less than the minimum front-to-front distance by an amount equal to or greater than the minimum gap distance, then the steps depicted in FIGS. 4–7 will be performed, because as a result of those steps, a minimum front-to-front distance and a minimum gap will inherently be established.

Minimum Gap Required/Article Actual Length Longer Than Minimum Front-to-Front Distance or Shorter than Minimum Front-to-Front Distance by Amount Less than Minimum Gap If a minimum gap is required, and the article actual length of the leading article, e.g., the second article A2, is longer than the minimum front-to-front distance (see FIG. 9), or is shorter than the minimum front-to-front distance by an amount less than the minimum gap distance (see FIG. 10), then the speed of the belt 24 will be controlled (i.e., sped up or slowed down) so that the actual front-to-front distance becomes equal to the actual length of article A2 plus the minimum gap MG, as shown in FIGS. 9 and 10, respectively.

The establishing of a minimum front-to-front distance in accordance with the present invention is more advantageous than a prior art system which simply establishes a predetermined gap between successive articles because such a prior art system must be "tuned" to the shorter articles, resulting in an excessively long gap being established between a longer leading article and the next article. That results in an unwarranted reduction in the overall throughput off the system.

It will be appreciated that although the conveyors 8, 10, 12, 14 are disclosed in the form of endless belts, they could comprise other suitable types of conveyors, such as driver rollers.

It may be desirable to provide a second photoeye 62 at the discharge end of the downstream conveyor 14 to verify the exiting of the articles.

Although the present invention has been described in connection with preferred embodiments thereof, it will be appreciated by those skilled in the are that additions, deletions, modifications, and substitutions not specifically described may be made without departing from the spirit and scope of the invention as defined in the appended claims.

What is claimed is:

1. A method of longitudinally conveying random-length articles in single file while establishing a minimum front-to-front distance between successive leading and trailing articles, comprising the steps of:

A) transferring the leading and trailing articles sequentially from a driven upstream conveyor to a driven variable speed downstream conveyor, while driving the downstream conveyor faster than the upstream conveyor, to create an initial rear-to-front gap between the leading and trailing articles;

B) transferring, subsequent to step A, the leading article onto a receiver conveyor;

C) sensing, subsequent to step A and prior to step B, front and rear ends of the leading article and determining an actual length thereof and an actual front-to-front distance between the leading and trailing articles;

D) comparing, subsequent to step C and prior to step B, the actual length of the leading article with a minimum front-to-front distance value;

E) comparing, subsequent to step C and prior to step B, the minimum front-to-front distance value with the actual front-to-front distance;

F) controlling, subsequent to step B, the speed of the downstream conveyor on which the trailing article is disposed, to make the actual front-to-front distance equal to the minimum front-to-front distance value, when the minimum front-to-front distance value exceeds the actual length of the leading article; and G) controlling, subsequent to step B, the speed of the downstream conveyor on which the trailing article is disposed, to make the actual front-to-front distance equal to the actual length of the leading article, when such actual length exceeds the minimum front-to-front distance value.

2. The method according to claim 1 wherein step A includes driving the upstream conveyor at a fixed speed ratio with respect to the downstream conveyor.

3. The method according to claim 1, further including, subsequent to steps F and G, discharging respective articles onto respective branch lines by respective diverter mechanisms.

4. The method according to claim 3 wherein the discharging comprises swinging a pivoted arm into contact with a respective article from a rest position, then back to the rest position.

5. The method according to claim 1 wherein step A includes transferring the articles onto upstream and downstream conveyors in the form of endless belts.

6. Apparatus for longitudinally conveying random-length articles in single file while establishing a minimum front-to-front distance between successive leading and trailing articles, comprising:

a driven upstream conveyor for conveying the leading and trailing articles at a first speed;

a variable speed-driven downstream conveyor for receiving the leading and trailing articles from the upstream conveyor and conveying the leading and trailing articles at a second speed faster than the first speed, to create an initial rear-to-front gap between the leading and trailing articles;

a receiver conveyor for receiving the leading and trailing articles from the downstream conveyor;

a sensor for sensing front and rear ends of the leading article traveling on the downstream conveyor; and a controller connected to the sensor and to a drive motor of the downstream conveyor for:

determining an actual length of the leading article and an actual front-to-front distance between the leading and trailing articles;

comparing the actual length of the leading article with a minimum front-to-front distance value;

comparing the minimum front-to-front distance value with the actual front-to-front distance;

controlling the speed of the downstream conveyor on which the trailing article is disposed, to make the actual front-to-front distance equal to the minimum front-to-front distance value, when the minimum front-to-front distance value exceeds the actual length of the leading article; and controlling the speed of the downstream conveyor on which the trailing article is disposed, to make the actual front-to-front distance equal to the actual length of the leading article, when such actual length exceeds the minimum front-to-front distance value.

7. The apparatus according to claim 6 wherein the upstream and downstream conveyors are driven at a constant speed ratio.

8. The apparatus according to claim 6, diverter mechanisms arranged downstream of the downstream conveyor for discharging respective articles onto respective branch lines.

9. The apparatus according to claim 8 wherein each diverter mechanism comprises a pivoted arm swingable between a rest position and an article-discharging position.

10. The apparatus according to claim 6 wherein the upstream and downstream conveyors are in the form of endless belts.

11. A method of longitudinally conveying random-length articles in single file while establishing a minimum front-to-front distance and a minimum rear-to-front gap between successive leading and trailing articles, comprising the steps of A) transferring the leading and trailing articles sequentially from a driven upstream conveyor to a driven variable speed downstream conveyor, while driving the downstream conveyor faster than the upstream conveyor, to create an initial rear-to-front gap between the leading and trailing articles;

B) transferring, subsequent to step A, the leading article onto a receiver conveyor;

C) sensing, subsequent to step A and prior to step B, front and rear ends of the leading article and determining an actual length thereof and an actual front-to-front distance between the leading and trailing articles;

D) comparing, subsequent to step C and prior to step B, the actual length of the leading article with a minimum front-to-front distance value and a minimum rear-to-front gap value;

E) comparing, subsequent to step C and prior to step B, the minimum front-to-front distance value with the actual front-to-front distance;

F) controlling, subsequent to step B, the speed of the downstream conveyor on which the trailing article is disposed, to make the actual front-to-front distance equal to a sum of the actual length of the leading article plus the minimum rear-to-front gap value, when the actual length exceeds the minimum front-to-front distance value;

G) controlling, subsequent to step B, the speed of the downstream conveyor on which the trailing article is disposed, to make the actual front-to-front distance equal to the sum of the actual length of the leading article plus the minimum rear-to-front gap value, when the minimum front-to-front distance value exceeds the actual length by an amount less than the minimum rear-to-front gap value; and H) controlling, subsequent to step B, the speed of the downstream conveyor on which the trailing article is disposed, to make the actual front-to-front distance equal to the minimum front-to-front distance value when the minimum front-to-front distance value exceeds the actual length by an amount greater than the minimum rear-to-front gap value.

12. The method according to claim 11 wherein step A includes driving the upstream conveyor at a fixed speed ratio with respect to the downstream conveyor.

13. The method according to claim 11, further including, subsequent to steps F, G and H, discharging respective articles onto respective branch lines by respective diverter mechanisms.

14. The method according to claim 13 wherein the discharging comprises swinging a pivoted arm into contact with a respective article from a rest position, and then back to the rest position.

15. Apparatus for longitudinally conveying random-length articles in single file while establishing a minimum front-to-front distance and a minimum rear-to-front gap between successive leading and trailing articles, comprising:

a driven upstream conveyor for conveying the leading and trailing articles at a first speed;

a variable speed-driven downstream conveyor for receiving the leading and trailing articles from the upstream conveyor and conveying the leading and trailing articles at a second speed faster than the first speed, to create an initial rear-to-front gap between the leading and trailing articles;

a receiver conveyor for receiving the leading and trailing articles from the downstream conveyor;

a sensor for sensing front and rear ends of the leading article traveling on the downstream conveyor; and a controller connected to the sensor and to a drive motor of the downstream conveyor for:

determining an actual length of the leading article and an actual front-to-front distance between the leading and trailing articles;

comparing the actual length of the leading article with a minimum front-to-front distance value and a minimum rear-to-front gap value;

comparing the minimum front-to-front distance value with the actual front-to-front distance;

controlling the speed of the downstream conveyor on which the trailing article is disposed, to make the actual front-to-front distance equal to a sum of the actual length of the leading article plus the minimum rear-to-front gap value, when the actual length exceeds the minimum front-to-front distance value;

controlling the speed of the downstream conveyor on which the trailing article is disposed, to make the actual front-to-front distance equal to the sum of the actual length of the leading article plus the minimum rear-to-front gap value, when the minimum front-to-front distance value exceeds the actual length by an amount less than the minimum rear-to-front gap value; and controlling the speed of the downstream conveyor on which the trailing article is disposed to make the actual front-to-front distance equal to the minimum front-to-front distance value when the minimum front-to-front distance value exceeds the actual length by an amount greater than the minimum gap value.

16. The apparatus according to claim 6 wherein the upstream and downstream conveyors are driven at a constant speed ratio.

17. The apparatus according to claim 6, diverter mechanisms arranged downstream of the downstream conveyor for discharging respective articles onto respective branch lines.

18. The apparatus according to claim 8 wherein each diverter mechanism comprises a pivoted arm swingable between a rest position and an article-discharging position.

19. The apparatus according to claim 6 wherein the upstream and downstream conveyors are in the form of endless belts.

* * * * *